United States Patent
Burnett et al.

(10) Patent No.: US 10,218,853 B2
(45) Date of Patent: Feb. 26, 2019

(54) WIRELESS CONFERENCE CALL TELEPHONE

(76) Inventors: Gregory C. Burnett, Northfield, MN (US); Michael Goertz, Redwood City, CA (US); Nicolas Jean Petit, Mountain View, CA (US); Zhinian Jing, Belmont, CA (US); Steven Foster Forestieri, Santa Clara, CA (US); Thomas Alan Donaldson, London (GB)

(*) Notice: Subject to any disclaimer, the term of this patent is extended or adjusted under 35 U.S.C. 154(b) by 0 days.

(21) Appl. No.: 13/184,429

(22) Filed: Jul. 15, 2011

(65) Prior Publication Data

US 2012/0184337 A1    Jul. 19, 2012

Related U.S. Application Data

(60) Provisional application No. 61/364,675, filed on Jul. 15, 2010.

(51) Int. Cl.

| | |
|---|---|
| *H04M 3/42* | (2006.01) |
| *H04M 3/56* | (2006.01) |
| *G10L 21/0208* | (2013.01) |
| *H04R 1/40* | (2006.01) |
| *H04R 3/00* | (2006.01) |
| *H04R 3/04* | (2006.01) |
| *G10L 21/0216* | (2013.01) |
| *H04R 1/10* | (2006.01) |

(52) U.S. Cl.
CPC ......... *H04M 3/568* (2013.01); *G10L 21/0208* (2013.01); *H04M 3/56* (2013.01); *H04R 1/406* (2013.01); *H04R 3/005* (2013.01); *H04R 3/04* (2013.01); *G10L 2021/02082* (2013.01); *G10L 2021/02165* (2013.01); *H04M 2203/509* (2013.01); *H04M 2250/62* (2013.01); *H04R 1/1083* (2013.01); *H04R 2420/07* (2013.01)

(58) Field of Classification Search
USPC ......................................................... 455/416
See application file for complete search history.

(56) References Cited

U.S. PATENT DOCUMENTS

| | | | |
|---|---|---|---|
| 6,816,469 B1* | 11/2004 | Kung et al. | 370/260 |
| 8,218,751 B2* | 7/2012 | Hepworth et al. | 379/204.01 |
| 2009/0081999 A1* | 3/2009 | Khasawneh et al. | 455/416 |
| 2009/0264114 A1* | 10/2009 | Virolainen et al. | 455/416 |

* cited by examiner

*Primary Examiner* — Nathan Mitchell

(57) ABSTRACT

A wireless conference call telephone system uses body-worn wired or wireless audio endpoints comprising microphones and, optionally, speakers. These audio-endpoints, which include headsets, pendants, and clip-on microphones to name a few, are used to capture the user's voice and the resulting data may be used to remove echo and environmental acoustic noise. Each audio-endpoint transmits its audio to the telephony gateway, where noise and echo suppression can take place if not already performed on the audio-endpoint, and where each audio-endpoint's output can be labeled, integrated with the output of other audio-endpoints, and transmitted over one or more telephony channels of a telephone network. The noise and echo suppression can also be done on the audio-endpoint. The labeling of each user's output can be used by the outside caller's phone to spatially locate each user in space, increasing intelligibility.

19 Claims, 6 Drawing Sheets

WIRELESS CONFERENCE CALL TELEPHONE

RELATED APPLICATIONS

This application claims the benefit of U.S. Patent Application No. 61/364,675, filed Jul. 15, 2010.

This application is related to U.S. patent application Ser. No. 12/139,333, filed Jun. 13, 2008.

This application is related to U.S. patent application Ser. No. 10/667,207, filed Sep. 18, 2003

TECHNICAL FIELD

The disclosure herein relates generally to telephones configured for conference calling, including such implementations as personal computers or servers acting as telephony devices.

BACKGROUND

Conventional conference call telephones use one or more microphones to sample acoustic sound in the environment of interest and one or more loudspeakers to broadcast the incoming communication. There are several difficulties involved in such communications systems, including strong echo paths between the loudspeaker(s) and the microphone(s), difficulty in clearly transmitting the speech of users in the room, and little or no environmental acoustic noise suppression. These problems result in the outside caller(s) having difficulty hearing and/or understanding all of the users, poor or impossible duplex communication, and noise (such as mobile phone ringers and typing on keyboards on the same table as the conference phone) being clearly transmitted through the conference call to the outside caller(s)—sometimes at a higher level than the users' speech.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
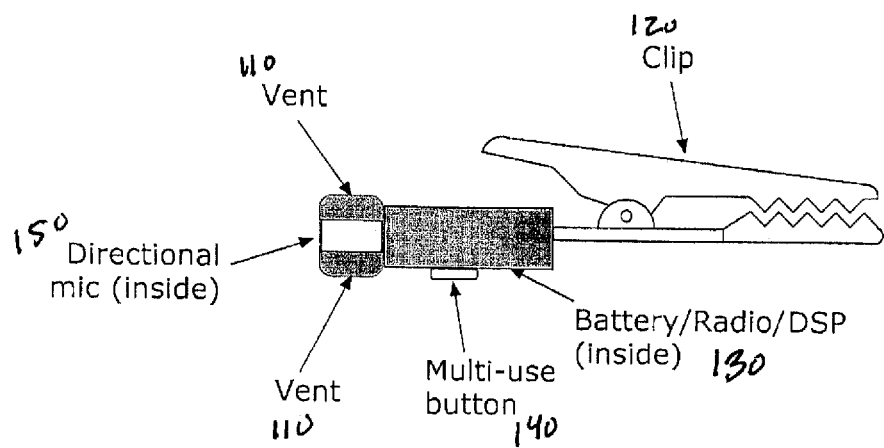
FIG. 1 shows a body-worn Child device as a clip-on microphone array, under an embodiment.

The conference-call telephone, also referred to as a speakerphone, is a vital tool in business today. A conventional speakerphone typically uses a single loudspeaker to transmit far-end speech and one or more microphones to capture near-end speech. The proximity of the loudspeaker to the microphone(s) requires effective echo cancellation and/or half-duplex operation. Also, the intelligibility of the users on both ends is often poor, and there may be very large differences in sound levels between users, depending on their distance to the speakerphone's microphone(s). In addition, no effective noise suppression of the near-end is possible, and various noises (like mobile phones ringing) create a large nuisance during the call.

A wireless conference call telephone system is described herein that addresses many of the problems of conventional conference call telephones. Instead of using microphones on or near the conference call telephone, the embodiments described herein use body-worn wired or wireless audio endpoints (e.g., comprising microphones and optionally, loudspeakers). These body-worn audio-endpoints (for example, headsets, pendants, clip-on microphones, etc.) are used to capture the user's voice and the resulting data may be used to remove echo and environmental acoustic noise. Each headset or pendant transmits its audio to the conference call phone, where noise and echo suppression can take place if not already performed on the body-worn unit, and where each headset or pendant's output can be labeled, integrated with the other headsets and/or pendants, and transmitted over a telephone network, over one or more telephony channels. The noise and echo suppression can also be done on the headset or pendant. The labeling of each user's output can be used by the outside caller's phone to spatially locate each user in space, increasing intelligibility.

In the following description, numerous specific details are introduced to provide a thorough understanding of, and enabling description for, embodiments of the wireless conference call telephone system and methods. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Unless otherwise specified, the following terms have the corresponding meanings in addition to any meaning or understanding they may convey to one skilled in the art.

The term "conference calling" is defined as the use of a telephony device that is designed to allow one or more near-end users to connect to a phone that will then connect through an analog or digital telephony network to another telephone(s).

The term "omnidirectional microphone" means a physical microphone that is equally responsive to acoustic waves originating from any direction.

The term "near-end" refers to the side of the telephone call that is in acoustic proximity to the conference calling system.

The term "far-end" refers to the side of the telephone call that is not in acoustic proximity to the conference calling system.

The term "noise" means unwanted environmental acoustic noise in the environment of the conference call phone.

The term "virtual microphones (VM)" or "virtual directional microphones" means a microphone constructed using two or more omnidirectional microphones and associated signal processing.

The term "Children" refers to one or more body-worn audio endpoints (for example, headsets or pendants or other body-worn devices that contain microphone arrays of at least one microphone and an optional loudspeaker). They may be wired or wireless. Children are hard-coded to the Parent so that they cannot easily be used with other devices. If needed, they may be recharged on the Parent for efficiency and convenience.

The term "Friends" refers to headsets or other similar devices that can be used with the Parent but are not restricted to the Parent. They may be wired or wireless. Examples are Bluetooth devices such as Aliph's Jawbone Icon headset (http://www.jawbone.com) and USB devices such as Logitech's ClearChat Comfort USB headset.

The term "Parent" refers to the main body of the conference call phone, where the different wired and/or wireless streams from each Child are received, integrated, and processed. The Parent broadcasts the incoming acoustic information to the Children and the Friends, or optionally, using a conventional loudspeaker.

The term HCI is an acronym for Host Controller Interface.

The term HFP is an acronym for the Hands-Free Profile, a wireless interface specification for Bluetooth-based communication devices.

The term PSTN is an acronym for Public Switched Telephone Network.

The term SDF is an acronym for Service Discovery Protocol.

The term SIP is an acronym for Session Initiate Protocol.

The term SPI bus is an acronym for Serial Peripheral Interface bus.

The term UART is an acronym for Universal asynchronous receiver/transmitter.

The term USART is an acronym for Universal synchronous/asynchronous receiver/transmitter.

The term USB is an acronym for Universal Serial Bus.

The term UUID is an acronym for Universally Unique Identifier.

The term VoIP is an acronym for Voice over Internet Protocol.

The wireless conference call telephone system described herein comprises wearable wired and/or wireless devices to transmit both incoming and outgoing speech with or without a loudspeaker to ensure that all users' speech is properly captured. Noise and/or echo suppression can take place on the wireless devices or on the Parent device. Some of the devices may be restricted to use only on the Parent to simplify operation. Other wireless devices such as microphones and loudspeakers are also supported, and any wireless transmission protocols alone or in combination can be used.

The wireless conference call telephone system of an embodiment comprises a fixed or mobile conferencing unit and a multiplicity of body-worn wireless telephony units or endpoints. The fixed or mobile conferencing unit comprises a telephony terminal that acts as an endpoint for a multiplicity of telephony calls (via PSTN, VoIP and similar). The fixed or mobile conferencing unit comprises a wireless terminal that acts as the gateway for a multiplicity of wireless audio sessions (for example Bluetooth HFP audio session). The fixed or mobile conferencing unit comprises an audio signal processing unit that inter-alia merges and optimizes a multiplicity of telephony calls into a multiplicity of wireless audio sessions and vice-versa. Optionally, the fixed or mobile conferencing unit comprises a loudspeaker.

The body-worn wireless telephony unit of an embodiment comprises a wireless communication system that maintains an audio session with the conferencing unit (such as a Bluetooth wireless system capable of enacting the HFP protocol). The body-worn wireless telephony unit comprises a user speech detection and transmission system (e.g., microphone system). The body-worn wireless telephony unit optionally comprises a means of presenting audio to the user. The body-worn wireless telephony unit optionally comprises a signal processor that optimizes the user speech for transmission to the conferencing unit (for example by removing echo and/or environmental noise). The body-worn wireless telephony unit optionally comprises a signal processor that optimizes received audio for presentation to the user.

Moving the microphones from the proximity of the loudspeaker to the body of the user is a critical improvement. With the microphones on the body of the user, the speech to noise ratio (SNR) is significantly higher and similar for all near-end users. Using technology like the Dual Omnidirectional Microphone Array (DOMA) (described in detail in U.S. patent application Ser. No. 12/139,333, filed Jun. 13, 2008) available from Aliph, Inc., San Francisco, Calif., two or more microphones can be used to capture audio that can be used to remove acoustic noise (including other users speaking) and echo (if a loudspeaker is still used to broadcast far-end speech). Under the embodiments herein, the signal processing is not required to be done on the device carried on the user, as the recorded audio from the microphones can be transmitted for processing on the Parent device. If a wireless headset device is used to house the microphones, the incoming far-end speech could also be broadcast to the headset(s) instead of using the loudspeaker. This improves echo suppression and allows true duplex, highly intelligible, private, conference conversations to take place.

The components of the wireless conference call telephone system are described in detail below. Each component, while described separately for clarity, can be combined with one or more other components to form a complete conference call system.

Wearable Devices (Children)

The term "Children" refers to one or more body-worn audio endpoints (for example, headsets or pendants or other body-worn devices that contain microphone arrays of at least one microphone and an optional loudspeaker). They may be wired or wireless. Children are hard-coded to a Parent so that they cannot easily be used with other devices. If desired, they may be recharged on the Parent for efficiency and convenience.

The wearable devices of an embodiment comprise a single microphone (e.g., omnidirectional microphone, directional microphone, etc.), analog to digital convertor (ADC), and a digital signal processor. The wearable devices also include a wireless communication component (e.g., Bluetooth, etc.) for transferring data or information to/from the wearable device. The wireless communication component enables fixed pairing between Parent and Child so that the Children don't get removed from the Parent. To assist this, the Children can be made to beep and/or flash and/or turn off when removed from the proximity of the Parent. For best effect, the Children may recharge on the Parent. Any number of Children may be used; four to eight should be sufficient for most conference calls. Optionally, wired devices such as headsets, microphones, and loudspeakers can be supported as well.

The wearable devices of an alternative embodiment comprise two or more microphones that form a microphone array (e.g., the DOMA (described in detail in U.S. patent application Ser. No. 12/139,333, filed Jun. 13, 2008) available from Aliph, Inc., San Francisco, Calif.). Using physical microphone arrays, virtual directional microphones are constructed that increase the SNR of the user's speech. The speech can be processed using an adaptive noise suppression algorithm, for example, the Pathfinder available from Aliph, Inc., San Francisco, Calif., and described in detail in U.S. patent application Ser. No. 10/667,207, filed Sep. 18, 2003. The processing used in support of DOMA, Pathfinder, and echo suppression can be performed on the Child or, alternatively, on the Parent. If a Parent loudspeaker is used and echo suppression is done on the Child, the Parent can route the speaker output to the Child via wireless communications to assist in the echo suppression process.

The Child may be head-worn (like a headset), in which case a Child loudspeaker can be used to broadcast the far-end speech into the ear of the user, or body-worn, in which case the Parent will be required to use a loudspeaker to broadcast the far-end speech. The body-worn device can clip on to the clothing of the user, or be hung from the head like a pendant. The pendant can use a hypoallergenic substance to construct the structure that goes around the neck since it may be in contact with the user's skin. If a headset is used as a Child, an on-the-ear mount is recommended over an in-the-ear mount, due to hygienic considerations.

As an example, FIG. 1 shows a body-worn Child device as a clip-on microphone array, under an embodiment. The device attaches to a user with a gator clip (120) as shown but the embodiment is not so limited. A single directional microphone (150) including vents (110) is used and the radio device (130), battery (130), and signal processing (130) are all housed in a small enclosure by the microphone. The Child is not, however, limited to these components or this configuration. Under an embodiment, the device includes a multi-use button (140) which may be used to place the device in a pairing/discoverable mode, break a connection with a Parent, mute the device microphone, etc.

Figure 2:
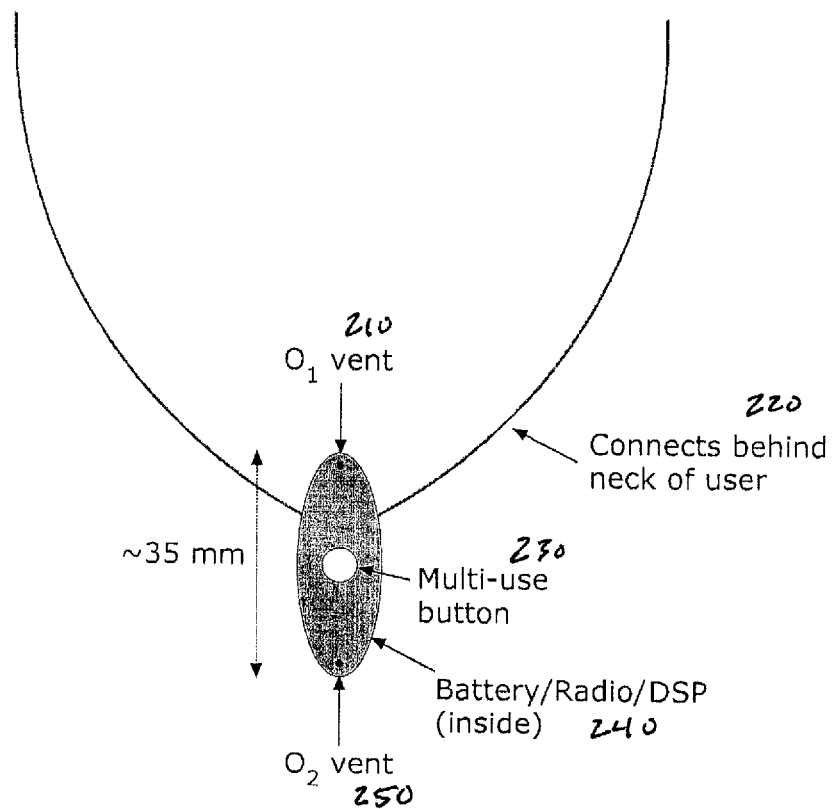
FIG. 2 shows a body-worn Child device as a pendant microphone array, under an alternative embodiment.

As another example, FIG. 2 shows a body-worn Child device as a pendant microphone array, under an alternative embodiment. Two omnidirectional microphones ($O_1$ and $O_2$) are used with a system such as the DOMA array. The device/microphone includes a vent for the $O_1$ microphone (210) and the $O_2$ microphone (250). The radio device (240), battery (240), and signal processing (240) are all housed in the pendant body which is worn around the neck like a necklace (220).

Regardless of physical embodiment, to extend battery life, simplify construction and updates, and decrease cost of the Children, most of the processing for echo and noise suppression of an embodiment can be done in the Parent. In this case, the Children record the incoming audio, multiplex the audio signals in the case of more than one microphone, and transmit them to the Parent for processing, as appropriate.

Battery life may be extended in an embodiment by performing processing on the Child that calculates an accurate Voice Activity Detection (VAD) signal. Then, the Child only transmits when detecting speech from its user. Similarly, the Child could use lower bandwidth and/or transmission power when the VAD signal indicates that the user is not speaking. Generally, only one or two people using the speakerphone will be talking at once, and wireless transmission (TX) is a significant power user, so considerable power savings may be realized using these methods. The VAD can also be shared with the Parent through many conventional methods (e.g., tone multiplexing) for use on the Parent for various algorithms (such as spatialization location of different speakers, integration of the different speaker speech data, and so on).

An optional extension useful for Children is the ability for Children to detect each other, and share information directly with one another, such as whether they are in use. This might be done, for example, using Bluetooth inquiry and appropriate SDP records. For example, one Child might detect that another Child is in range and in use (in which case it is likely that the physical user of the one Child is in audible range of the physical user of the other Child) and makes changes to its audio processing (if any), for example to enhance echo suppression.

The Parent

The term "Parent" refers to the main body of the conference call phone, where the different wired and/or wireless streams from each Child are received, integrated, and processed. The Parent broadcasts the incoming acoustic information to the Children and the Friends, or optionally, using a conventional loudspeaker. The Parent device couples or connects to the telephone network, has a dialing interface, and uses wired and/or wireless protocols to communicate to its "Children" (devices that can only be used with the Parent) and "Friends" (other devices that can be used with the Parent). Embodiments of the Parent device are described in detail below.

The Parent device of a first embodiment includes a conventional loudspeaker and microphone(s), and enables the making of Bluetooth and/or other wireless connections. The Parent device can have Children, but Children are not required. This configuration offers an incremental improvement to the speakerphone, as anyone without a Bluetooth or similar device will not see any benefit. This configuration eliminates the need for a parent loudspeaker only when all near-end users connect to the Parent through Friend devices. Therefore the loudspeaker will have to be used for many calls, and its echo can be difficult to remove from the Friend device microphone(s) data.

The Parent device of a second embodiment is significantly different than conventional speakerphones and offers markedly better performance. The Parent of the second embodiment does not contain a loudspeaker or microphones so it has a size form factor that is smaller than conventional speakerphones. The Parent has between 4 and 8 Children, and is able to couple or connect to 4 to 8 Friends. While couplings between a Parent and a number of Children/Friends are possible, 16 connections would likely handle the needs of most speakerphone users. The Parent broadcasts the far-end speech to all Children and Friends, and uses a single wireless outbound channel in order to save bandwidth since the same information is being broadcast to all Children and Friends. The Parent receives the incoming wireless transmissions and integrates them into a single outgoing transmission. For the Children without onboard processing, the Parent demultiplexes the incoming signal (if more than one microphone is used) and performs signal processing tasks such as echo cancellation, noise suppression, voice activity detection, and any other processing needed prior to integration with other wireless signals.

Integration of the incoming Children and Friends audio channels together into a single outgoing stream involves calculating a dynamic gain for each channel so that all outgoing streams from both Children and Friends are at roughly the same level. This is accomplished through the use of a root-mean-square (RMS) calculation that is only calculated when the user is speaking in an embodiment.

Figure 3:
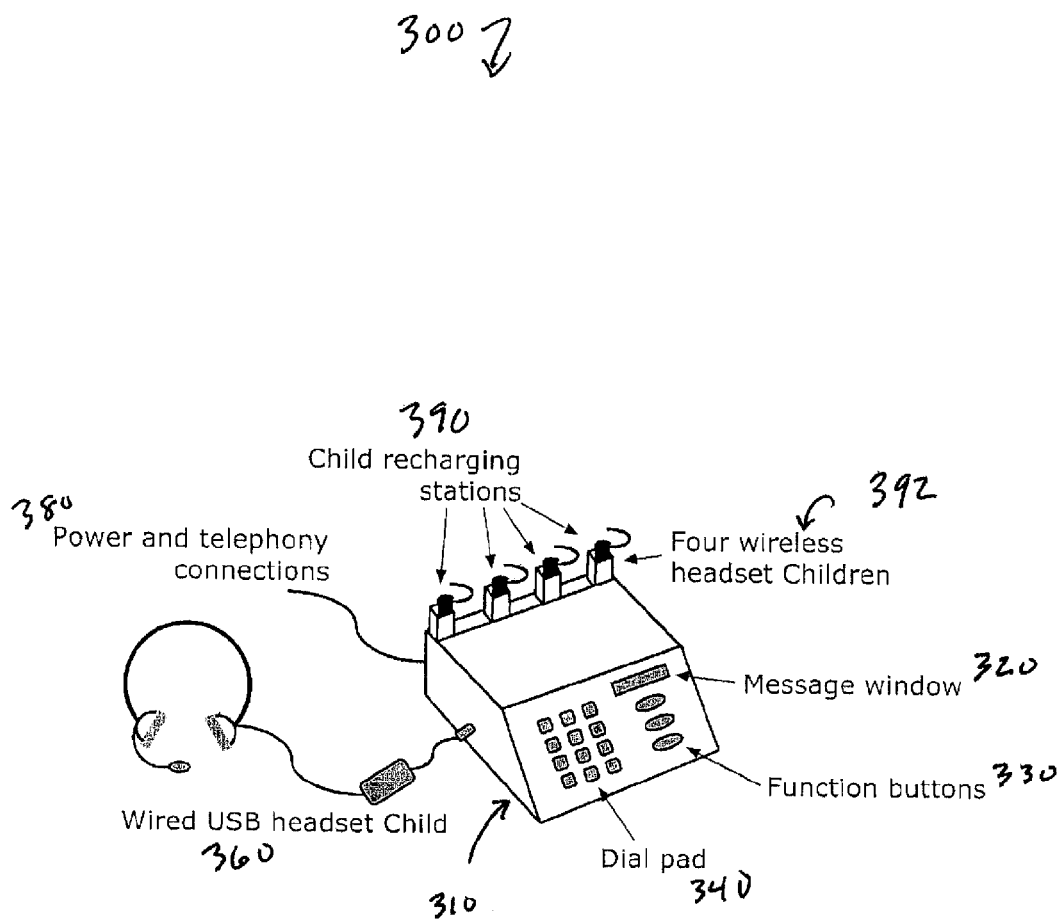
FIG. 3 shows a wireless conference call telephone system comprising a Parent with four wireless Children and one wired Child, under an embodiment.

An embodiment of the second configuration is shown in, for example, FIG. 3, which shows a wireless conference call telephone system comprising a Parent (310) with four wireless Children (392) and one wired Child (360), under an embodiment. This embodiment includes Child recharging docking stations (390) for the Children. In this embodiment four Children are wireless on-the-ear headsets (392), and one Child is a wired headset (360). The Parent provides an interface configured for the desired features of an embodiment including a dial pad (340), function buttons (330) and message window (320). The Parent further provides couplings to a power source and telephony network (380).

A further increase in utility is realized when Friends are paired to the Parent. To simplify pairing, the Parent's inquiry power (the power of the inquiry signal, which searches for devices with which to pair) may be reduced to the point where it is detectable by Friends only within a meter or less. Any friend device wishing to be paired with the Parent should be placed in pairing mode and then brought into this new reduced pairing range, where it can be paired with the Parent. This reduces the number of undesired pairings. In addition, the pairing can be classified as transient, so that the record of the pairing will be erased at the next power on/off or charging cycle. This prevents the friend's pairing record from becoming needlessly cluttered.

Placing of the unit of an embodiment in pairing mode is performed using at least one button and/or switch of one or more of the Parent and Child/Friend. Under an alternative embodiment, the device to be paired is shaken and an accelerometer is used to trigger pairing mode after a certain number and strengths of shakes.

Although any wireless protocol may be used in an embodiment, the use of Bluetooth allows the addition of ancillary devices such as Bluetooth loudspeakers and microphones, which may be used with an embodiment in which the Parent has neither loudspeakers nor microphones. The flexibility allowed through the use of Bluetooth devices is unprecedented because it enables the system to comprise anything from a Parent and a single Child to a Parent, Bluetooth loudspeaker, and Bluetooth microphone up to to 16 or more Bluetooth headsets.

EXAMPLE EMBODIMENT

Figure 4:
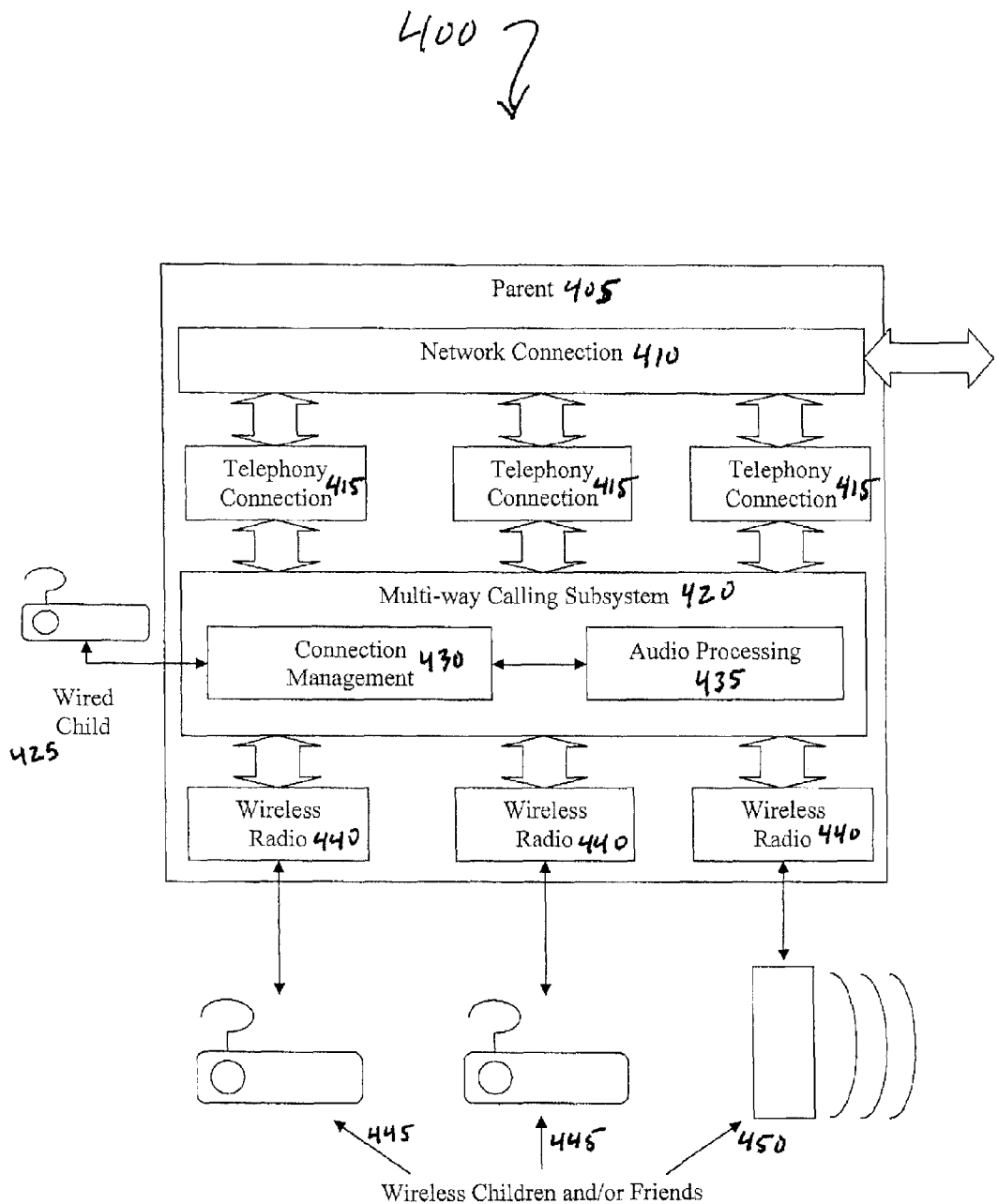
FIG. 4 shows a block diagram of a wireless conference call telephone system comprising a Parent and its modules and the Children/Friends (three headsets and a loudspeaker), under an embodiment.

FIG. 4 shows a block diagram of a wireless conference call telephone system comprising a Parent (405) and its modules and the Children/Friends (three headsets (425, 445) and a loudspeaker (450)), under an embodiment. A conference calling Parent (405), incorporating network connectivity (410), a multiplicity of telephony connections (415), a multiplicity of wireless radios (440), and a multi-way calling subsystem (420), is shown coupled or connected to two wireless headsets (445), a wired headset (425), and a loudspeaker (450). In addition, both Children and Friends are supported. A minimum of 4 Children/Friends are recommended, and a maximum of 16 should be sufficient for most uses. The maximum number possible will be determined by the wireless protocol and corresponding stack chosen. Wired devices such as headsets, microphones, and loudspeakers are also supported. The number of Children and/or Friends may vary within the duration of a single call if near-end users enter and leave the conference call.

The Parent includes a suitable microprocessor with embedded peripherals together with suitable external peripherals on a printed circuit board. In an embodiment these could be an ARM11 microprocessor with embedded Ethernet connections and sufficient number of UART, USART, SPI, USB, or similar busses and appropriate memory for the number of connections desired.

The network connectivity can be provided by one or more Ethernet connections and/or one or more Wifi connections, but the embodiment is not so limited. Each of the wireless radios can be implemented using a Bluetooth radio device using the HCI protocol over UART or USART or USB with the provided microprocessor.

The telephony connections can be provided by suitable software code running on the Parent microprocessor to implement a telephony protocol. For example, a number of SIP telephony connections might be provided by using a SIP software stack, such as the commercially available PJSIP software stack. In such an instance, it will be understood that the SIP software stack may need to register over the network with a SIP server, and perform such other tasks as is well known by those skilled in the art to provide a SIP connection that can make and/or receive telephony calls using the SIP protocol.

The Parent's multi-way calling subsystem (420) provides connection management (430) and audio stream management (435). These functions may be provided by suitable software code running on the microprocessor. The audio processing subsystem (435) processes and routes audio from the Bluetooth radios and telephony connections, and may also be used to perform additional audio processing tasks such as spatialization, equalization, noise suppression, echo suppression, and other tasks. The connection management subsystem (430) manages the connection and disconnection of audio streams into the conference call (including telephony connections and wireless and/or wired connections from Friends and Children).

The Children and/or Friends of an embodiment can be any number of available Bluetooth headsets such as the Jawbone Bluetooth headset, manufactured by Aliph. Other wireless protocols (e.g., ZigBee, etc.) can also be used if desired, and wired connections are also supported.

In an embodiment where the wireless radio is a Bluetooth radio and the conference calling Children and/or Friends are Bluetooth headsets, an effective implementation provides one Bluetooth radio for each Child/Friend. Communication between the Parent radio and the Child/Friend can use proprietary profiles or commercially available ones such as the Bluetooth Headset Profile as defined in the Bluetooth specifications. In an embodiment, the Bluetooth radio in the Parent acts in the Bluetooth slave role, but the embodiment is not so limited. This will allow each Child/Friend to form its own piconet with the Parent, resulting in good flexibility. Other configurations known to those skilled in the art are possible, however.

Figure 5:
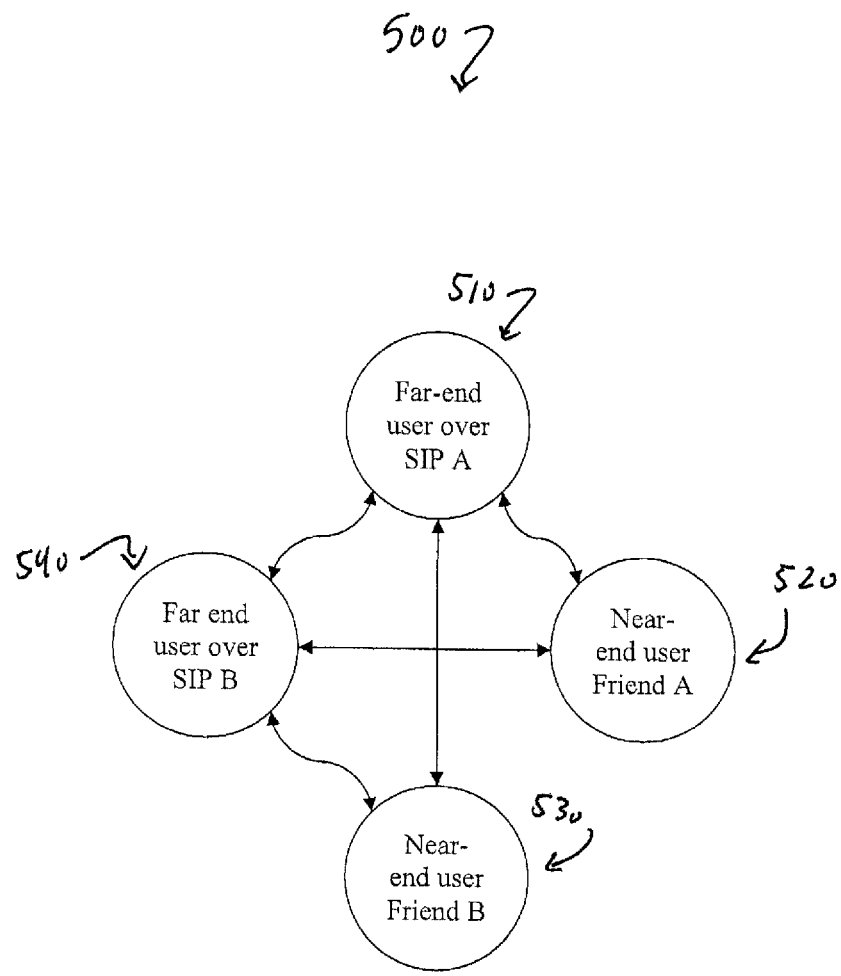
FIG. 5 is a flow diagram showing audio streaming between two far-end users and two near-end users, under an embodiment.

FIG. 5 is a flow diagram showing audio streaming between two far-end users (510, 540) and two near-end users (520, 530), under an embodiment. This flow diagram illustrates the connectivity of audio streams in an embodiment in which two far-end users are connecting to the conference call remotely via telephony (in this case using SIP), and two near-end users are in the same room as the Parent using Friends and/or Children. It is assumed that the near-end users in the same room as the Parent are able to hear each other directly, so the audio from each of them will not be routed to the other's headset. If the room is large enough that mutual hearing is difficult, then it is possible to route the output of each headset to the input of the others, but that is not expected to be needed in most situations.

Figure 6:
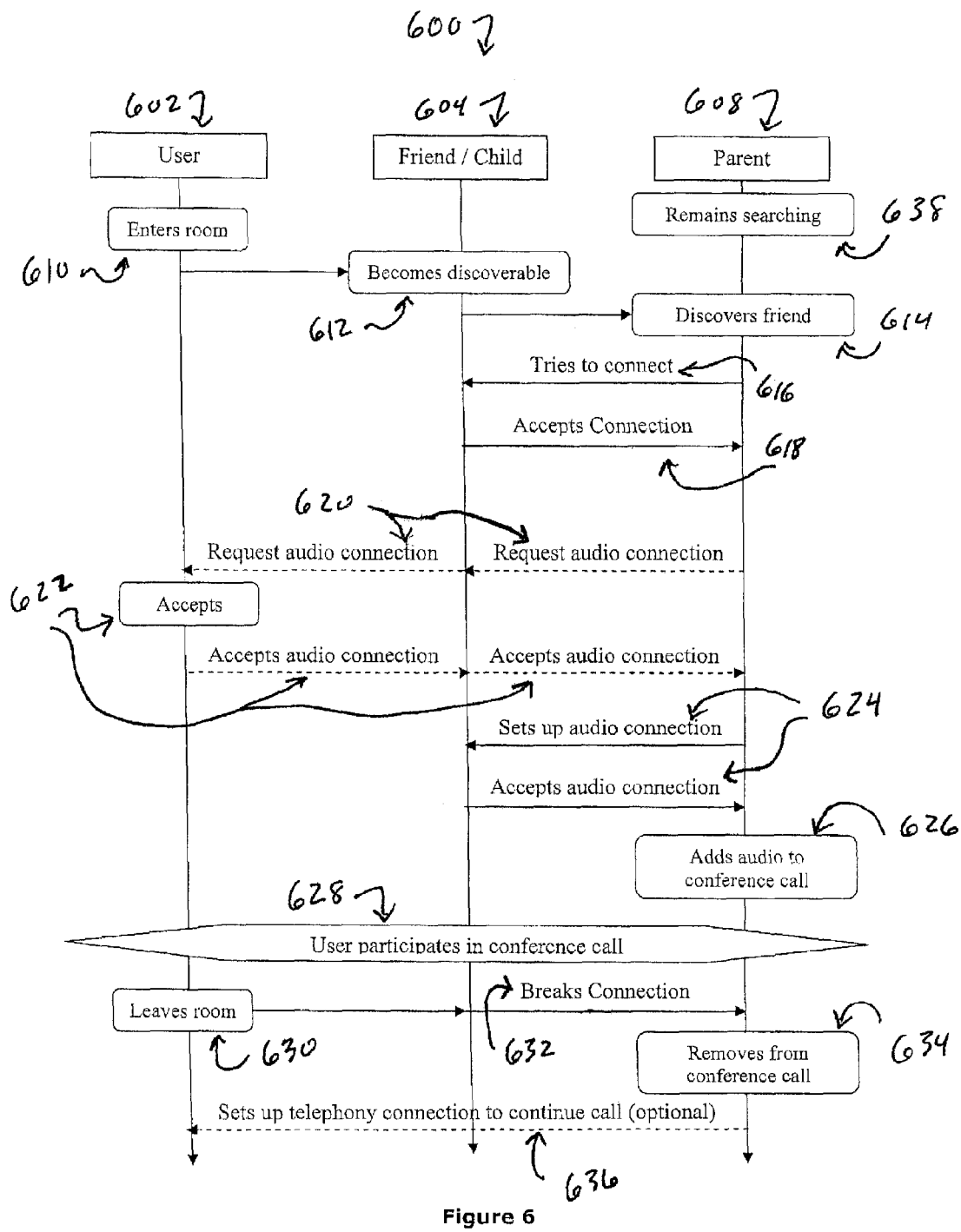
FIG. 6 is a flow chart for connecting wireless Friends/Children and a Parent of the wireless conference call telephone system, under an embodiment.

FIG. 6 is a flow diagram for connecting wireless Friends/Children (604) and a Parent (608) of the wireless conference call telephone system, under an embodiment. This flow diagram illustrates a process by which a wireless Friend or Child may be added to the conference call. The user (602) enters the room in which the conference is being held, which includes the Parent (608). The Friend or Child they are using becomes discoverable (612) to the conference calling unit either through user action (for example a button press), or through the mere action of entering the room (610) (for example, the headset is always in discoverable mode but only over a short wireless range, so only becomes discoverable when in proximity of the Parent). Such discoverability might be achieved, for example, by the Friend entering Bluetooth discoverable mode (that is, starting to scan for Bluetooth inquiries and pages, as defined in the Bluetooth specification).

Similarly, the Parent regularly searches (638) for newly available Children or Friends. Such searching may be continuous, initiated by a user button press, and/or initiated by simply picking up a Child equipped with a sensing accelerometer that can be used to sense being picked up by a user. Once in search mode, the Parent will regularly search for available Children by sending out Bluetooth inquiries and listening for responses. When the Parent discovers (614) the Friend/Child by receiving an appropriate response to its inquiry (for example, giving a suitable Bluetooth class of device, or a suitable Bluetooth hardware address or suitable pre-agreed UUIDs or other data in the extended inquiry response), the Parent may attempt to connect (616) using the process defined in the Bluetooth specification. The Child automatically accepts (618) this invitation and is connected to the Parent, but the Friend should confirm that it wants to be connected to the Parent to reduce unwanted Parent/Friend pairings (such as when a near-end user has a Bluetooth device on his or her person but wishes to use a Child to connect to the Parent). Accordingly, parent issues an audio connection request (620) to the Friend and associated user (602). If the pairing is accepted (622), the Parent will attempt to connect (624) the Friend/Child to the conference call. Since this embodiment uses Bluetooth, if it is a wireless device attempting to connect then the RING command, as defined in the Bluetooth headset or hands-free profile, will be used. A wired device can be connected with no further input from the user required. The Friend/Child may indicate to the user that the Parent is attempting to connect the audio (for example, playing an audible tone) and the user may accept this connection (for example by pressing a button) and as a result the Parent-to-Friend/Child audio connection will be made (626). The user may then participate in the conference call (628).

Once the Friend/Child accepts the audio connection into the conference call, the multi-way calling subsystem may connect the audio to/from the Friend/Child with other audio streams as described in FIG. 5.

This configuration allows the near-end user to converse in person with other near-end users of Friends and/or Children that happen to be in the room as well as clearly hear far-end users connected to the Parent. Conversely, the far-end users will be able to clearly hear all near-end users using a Friend and/or Child. This contrasts with conventional speakerphones, where it can be very difficult for far-end users to hear all near-end users clearly. In addition, if the Friends and Children are equipped with noise suppression, environmental noises such as phones ringing, typing, and other acoustic noises will be suppressed before transmission. Also, the signal-to-noise ratio (SNR) will be significantly higher even without noise suppression because the distance between each near-end user and the microphones of the Friends and/or Children will be much higher than the desk-mounted microphones in use today in conventional systems.

The near-end users will also be able to clearly hear all remote users, and remote users will also be able to converse with each other. A clear, full conference with excellent intelligibility and audio quality is the result. Private conversations are also possible between participants in the room merely by muting their Friends/Children, or using a button on the Parent to mute all Children and Friends. If the Friends and Children contain noise suppression of sufficient strength (e.g., the Jawbone Bluetooth headset available from Aliph, Inc., San Francisco, Calif.), it is also possible for one person to say something private to all others in the room by muting their Friend/Child and speaking normally. The Friends and Children of the other near-end users will remove the speech of the other person so that it is not transmitted to the far-end. Similarly, Children or Friends with no microphones (only a loudspeaker) may be used to monitor the far-end speech. Conversely, Children or Friends with no loudspeaker (only microphone(s)) may be used to broadcast a near-end user's speech to the far end.

A wireless near-end user may break the connection (632) to Parent or exit the conference call (632) at any time by hanging up the call using a button on the Child/Friend, placing the Child back into its recharging cradle, or simply by leaving the room or walking out of range of the Parent (630). A Child equipped with an accelerometer or similar device may be programmed to leave the call when placed on the table or tapped by the user. Optionally, after disconnection (632, 634), the Parent may make a telephony connection (e.g. a SIP call) to the disconnected user via a pre-determined phone number in order to allow them to continue remotely if desired (636). Therefore, a user that was taking part in a conference call in person can have the conference call routed to his mobile phone in order to continue the conference call in his car.

These embodiments use Bluetooth as their wireless protocol but are not so limited.

Embodiments described herein include a system comprising a wireless communication device (WCD) worn by a near-end participant during a telephone call with a far-end participant. The WCD includes at least one microphone. The system includes a telephony gateway remote to the WCD and including an audio processor coupled to a wireless radio that forms an audio channel with the WCD. The audio processor generates a first audio signal from signals received from the WCD. The telephony gateway comprises a connection component coupled to the audio processor and to a network carrying the telephone call. The connection component couples the first audio signal to the network for transmission to the far-end participant. The connection component receives a second audio signal from the far-end participant. The system includes a speaker coupled to the connection component and outputting the second audio signal.

Embodiments described herein include a system comprising: a wireless communication device (WCD) worn by a near-end participant during a telephone call with a far-end participant, wherein the WCD includes at least one microphone; a telephony gateway remote to the WCD and including an audio processor coupled to a wireless radio that forms an audio channel with the WCD, wherein the audio processor generates a first audio signal from signals received from the WCD, wherein the telephony gateway comprises a connection component coupled to the audio processor and to a network carrying the telephone call, wherein the connection component couples the first audio signal to the network for transmission to the far-end participant, wherein the connection component receives a second audio signal from the far-end participant; and a speaker coupled to the connection component and outputting the second audio signal.

The at least one microphone of an embodiment comprises an omnidirectional microphone.

The at least one microphone of an embodiment comprises a directional microphone.

The at least one microphone of an embodiment comprises two microphones.

The WCD of an embodiment comprises a signal processor coupled to the at least one microphone.

The signal processor of an embodiment performs demultiplexing on signals from the at least one microphone.

The signal processor of an embodiment performs echo cancellation on signals from the at least one microphone.

The signal processor of an embodiment performs noise suppression on signals from the at least one microphone.

The signal processor of an embodiment performs voice activity detection on signals from the at least one microphone.

The WCD of an embodiment comprises a headset that contains the at least one microphone and the signal processor, wherein the headset is worn in a head region of the near-end participant.

The WCD of an embodiment comprises a pendant that contains the at least one microphone and the signal processor, wherein the pendant is worn on a near-end participant.

The WCD of an embodiment includes the speaker, wherein the telephony gateway transmits the second audio signal to the WCD and the speaker outputs the second audio signal.

The WCD of an embodiment comprises a headset that contains the at least one microphone, the speaker, and the signal processor, wherein the headset is worn in a head region of the near-end participant.

The WCD of an embodiment is hard-coded to the telephony gateway.

The WCD of an embodiment includes a detector that electronically detects at least one other WCD within a pre-specified range of the WCD.

The telephony gateway of an embodiment includes the speaker.

The speaker of an embodiment outputs the first audio signal.

The speaker of an embodiment outputs the second audio signal.

The WCD of an embodiment comprises a pendant that contains the at least one microphone, wherein the pendant is worn on a near-end participant.

The system of an embodiment comprises a telephone interface coupled to the connection component, wherein the telephone interface is used to control parameters of the telephone call.

The telephone interface of an embodiment includes a dialing interface.

The wireless radio of an embodiment comprises a Bluetooth radio.

The telephony gateway of an embodiment includes a charger, wherein the WCD couples to the charger to recharge.

The WCD of an embodiment includes a pairing mode, wherein in the pairing mode the WCD searches for at least one of the telephony gateway and at least one other WCD with which to electronically pair.

The telephony gateway of an embodiment includes a pairing mode, wherein in the pairing mode the telephony gateway searches for the WCD with which to electronically pair.

The electronic pairing of an embodiment between the WCD and the telephony gateway is classified as transient, wherein the pairing classified as transient is subsequently erased by the telephony gateway.

The audio processor of an embodiment performs demultiplexing on each incoming signal from each WCD.

The audio processor of an embodiment performs echo cancellation on each incoming signal from each WCD.

The audio processor of an embodiment performs noise suppression on each incoming signal from each WCD.

The audio processor of an embodiment performs voice activity detection on each incoming signal from each WCD.

The audio processor of an embodiment performs spatialization on each incoming signal from each WCD.

The audio processor of an embodiment performs equalization on each incoming signal from each WCD.

The connection component of an embodiment manages the audio channel with the WCD.

The system of an embodiment comprises a plurality of wireless communication devices (WCDs) that includes the WCD, wherein the plurality of WCDs is worn by a plurality of near-end participants during the telephone call.

The telephony gateway of an embodiment comprises a plurality of wireless radios that includes the wireless radio, wherein the plurality of wireless radios is coupled to the audio processor, wherein each wireless radio is electronically paired with a corresponding WCD of the plurality of WCDs and provides a dedicated channel with the corresponding WCD.

The plurality of wireless radios of an embodiment comprises a plurality of Bluetooth radios.

The telephony gateway of an embodiment electronically labels each incoming signal from each WCD.

The audio processor of an embodiment integrates signals received from the plurality of WCDs to generate the first audio signal.

The audio processor of an embodiment integrates signals received from the plurality of WCDs by calculating a dynamic gain for each dedicated channel corresponding to each WCD.

The calculating of the dynamic gain of an embodiment comprises calculating a root-mean-square when the near-end participant is speaking.

The telephony gateway of an embodiment transmits the second audio signal to the plurality of WCDs.

The system of an embodiment comprises a plurality of speakers that include the speaker, wherein each WCD of the plurality of WCDs includes a speaker of the plurality of speakers, wherein the telephony gateway transmits the second audio signal to the plurality of WCDs and the plurality of speakers outputs the second audio signal.

The connection component of an embodiment manages the dedicated channels with the plurality of WCDs.

Each WCD of an embodiment includes a detector, wherein the detector of a WCD electronically detects at least one WCD within a pre-specified range of the WCD.

Embodiments described herein include a system comprising at least one wireless communication device (WCD) worn by at least one near-end participant during a telephone call with a far-end participant. The system includes a telephony gateway remote to the at least one WCD and including an audio processor coupled to at least one wireless radio that forms at least one audio channel with the at least one WCD. The audio processor generates an integrated audio signal from signals received from the at least one WCD. The telephony gateway comprises a connection component coupled to the audio processor and to a network carrying the telephone call. The connection component couples the integrated audio signal to the network for transmission to the far-end participant.

Embodiments described herein include a system comprising: at least one wireless communication device (WCD) worn by at least one near-end participant during a telephone call with a far-end participant; and a telephony gateway remote to the at least one WCD and including an audio processor coupled to at least one wireless radio that forms at least one audio channel with the at least one WCD, wherein the audio processor generates an integrated audio signal from signals received from the at least one WCD, wherein the telephony gateway comprises a connection component coupled to the audio processor and to a network carrying the telephone call, wherein the connection component couples the integrated audio signal to the network for transmission to the far-end participant.

Embodiments described herein include a system comprising a plurality of wireless communication devices (WCDs) worn by a plurality of near-end participants during a telephone call with a far-end participant. The system includes a telephony gateway remote to the plurality of WCDs and including an audio processor coupled to at least one wireless radio that forms a dedicated audio channel with each WCD of the plurality of WCDs. The audio processor generates an integrated audio signal from the plurality of signals received from the plurality of WCDs. The telephony gateway comprises a connection component coupled to the audio processor and to a network carrying the telephone call. The connection component couples the integrated audio signal to the network for transmission to the far-end participant.

Embodiments described herein include a system comprising: a plurality of wireless communication devices (WCDs) worn by a plurality of near-end participants during a telephone call with a far-end participant; and a telephony gateway remote to the plurality of WCDs and including an audio processor coupled to at least one wireless radio that forms a dedicated audio channel with each WCD of the plurality of WCDs, wherein the audio processor generates an integrated audio signal from the plurality of signals received from the plurality of WCDs, wherein the telephony gateway comprises a connection component coupled to the audio processor and to a network carrying the telephone call, wherein the connection component couples the integrated audio signal to the network for transmission to the far-end participant.

Embodiments described herein include a telephony gateway comprising an audio processor coupled to at least one wireless radio that forms at least one audio channel with at least one wireless communication device (WCD) that is remote to the telephony gateway and worn by at least one near-end participant during a telephone call with a far-end participant. The audio processor generates an integrated audio signal from signals received from the at least one WCD. The telephony gateway comprises a connection component coupled to the audio processor and to a network carrying the telephone call. The connection component couples the integrated audio signal to the network for transmission to the far-end participant.

Embodiments described herein include a telephony gateway comprising an audio processor coupled to at least one wireless radio that forms at least one audio channel with at least one wireless communication device (WCD) that is remote to the telephony gateway and worn by at least one near-end participant during a telephone call with a far-end participant, wherein the audio processor generates an integrated audio signal from signals received from the at least one WCD, wherein the telephony gateway comprises a connection component coupled to the audio processor and to a network carrying the telephone call, wherein the connection component couples the integrated audio signal to the network for transmission to the far-end participant.

Embodiments described herein include a telephony gateway comprising an audio processor coupled to at least one wireless radio that forms a plurality of audio channels with a plurality of wireless communication devices (WCDs) that is remote to the telephony gateway and worn by near-end participants during a telephone call with a far-end participant. The audio processor generates an integrated audio signal from signals received from the plurality of WCDs. The telephony gateway couples the integrated audio signal to the network for transmission to the far-end participant.

Embodiments described herein include a telephony gateway comprising an audio processor coupled to at least one wireless radio that forms a plurality of audio channels with a plurality of wireless communication devices (WCDs) that is remote to the telephony gateway and worn by near-end participants during a telephone call with a far-end participant, wherein the audio processor generates an integrated audio signal from signals received from the plurality of WCDs, wherein the telephony gateway couples the integrated audio signal to the network for transmission to the far-end participant.

Embodiments described herein include a system comprising a plurality of wireless communication devices (WCDs). Each WCD is worn by a near-end participant during a telephone call with a far-end participant. The system includes a telephony gateway including, a plurality of radios. Each radio is electronically paired with a corresponding WCD of the plurality of WCDs and provides a dedicated channel with the corresponding WCD. The system includes a processor coupled to the plurality of radios. The processor integrates signals received from the plurality of WCDs into a first audio signal. The system includes a telephony component coupled to the processor and to a network carrying the telephone call. The telephony component couples the first audio signal to the network for transmission to the far-end participant. The telephony component receives a second audio signal from the far-end participant. The system includes a telephone interface coupled to the telephony component. The telephone interface is used to control parameters of the telephone call.

Embodiments described herein include a system comprising: a plurality of wireless communication devices (WCDs), wherein each WCD is worn by a near-end participant during a telephone call with a far-end participant; and a telephony gateway including, a plurality of radios, wherein each radio is electronically paired with a corresponding WCD of the plurality of WCDs and provides a dedicated channel with the corresponding WCD; a processor coupled to the plurality of radios, wherein the processor integrates signals received from the plurality of WCDs into a first audio signal; a telephony component coupled to the processor and to a network carrying the telephone call, wherein the telephony component couples the first audio signal to the network for transmission to the far-end participant, wherein the telephony component receives a second audio signal from the far-end participant; a telephone interface coupled to the telephony component, wherein the telephone interface is used to control parameters of the telephone call.

The WCD of an embodiment includes at least one microphone.

The at least one microphone of an embodiment comprises an omnidirectional microphone.

The at least one microphone of an embodiment comprises a directional microphone.

The WCD of an embodiment comprises a signal processor coupled to the at least one microphone.

The signal processor of an embodiment performs demultiplexing on each incoming signal from each WCD.

The signal processor of an embodiment performs echo cancellation on each incoming signal from each WCD.

The signal processor of an embodiment performs noise suppression on each incoming signal from each WCD.

The signal processor of an embodiment performs voice activity detection on each incoming signal from each WCD.

The signal processor of an embodiment electronically labels each signal output from each WCD.

The WCD of an embodiment comprises a headset that contains the at least one microphone and the signal processor, wherein the headset is worn in a head region of the near-end participant.

The WCD of an embodiment comprises a pendant that contains the at least one microphone and the signal processor, wherein the pendant is worn on a near-end participant.

Each WCD of an embodiment includes a speaker coupled to the signal processor.

The telephony gateway of an embodiment transmits the second audio signal to the plurality of WCDs.

The speaker of an embodiment outputs the second audio signal.

The WCD of an embodiment comprises a headset that contains the at least one microphone, the speaker, and the signal processor, wherein the headset is worn in a head region of the near-end participant.

Each WCD of an embodiment is hard-coded to the telephony gateway.

At least one WCD of an embodiment is coupled to the telephony gateway using a wireless coupling.

At least one WCD of an embodiment is coupled to the telephony gateway using a wired coupling.

Each WCD of an embodiment includes a detector, wherein the detector of a WCD electronically detects at least one WCD within a pre-specified range of the WCD.

The processor of an embodiment integrates signals received from the plurality of WCDs by calculating a dynamic gain for each dedicated channel corresponding to each WCD.

The calculating of the dynamic gain of an embodiment comprises calculating a root-mean-square when the near-end participant is speaking.

The telephony gateway of an embodiment includes a speaker coupled to the processor.

The speaker of an embodiment outputs the first audio signal.

The speaker of an embodiment outputs the second audio signal.

The WCD of an embodiment comprises a pendant that contains the at least one microphone, wherein the pendant is worn on a near-end participant.

The telephone interface of an embodiment includes a dialing interface.

The plurality of radios of an embodiment comprises a plurality of Bluetooth radios.

The telephony gateway of an embodiment electronically labels each incoming signal from each WCD.

The telephony gateway of an embodiment includes a charger, wherein the plurality of WCDs couple to the charger to recharge.

At least one WCD of an embodiment includes a pairing mode, wherein in the pairing mode the at least one WCD searches for at least one of the telephony gateway and at least one other WCD with which to electronically pair.

The telephony gateway of an embodiment includes a pairing mode, wherein in the pairing mode the telephony gateway searches for at least one WCD with which to electronically pair.

The electronic pairing of an embodiment between a WCD of the plurality of WCDs and the telephony gateway is classified as transient, wherein the pairing classified as transient is subsequently erased by the telephony gateway.

The processor of an embodiment comprises an audio processing subsystem.

The audio processing subsystem of an embodiment performs demultiplexing on each incoming signal from each WCD.

The audio processing subsystem of an embodiment performs echo cancellation on each incoming signal from each WCD.

The audio processing subsystem of an embodiment performs noise suppression on each incoming signal from each WCD.

The audio processing subsystem of an embodiment performs voice activity detection on each incoming signal from each WCD.

The audio processing subsystem of an embodiment performs spatialization on each incoming signal from each WCD.

The audio processing subsystem of an embodiment performs equalization on each incoming signal from each WCD.

The processor of an embodiment comprises a connection management subsystem that manages the dedicated channels with the plurality of WCDs.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants. The method includes receiving at the telephony gateway audio signals from the plurality of WCDs. The method includes generating in response to the audio signals a first audio signal. The generating comprises integrating the audio signals from the plurality of WCDs. The method includes establishing a conference call between the plurality of near-end participants and a far-end participant by coupling the first audio signal to a network that transmits the first audio signal to the far-end participant.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants; receiving at the telephony gateway audio signals from the plurality of WCDs; generating in response to the audio signals a first audio signal, the generating comprising integrating the audio signals from the plurality of WCDs; and establishing a conference call between the plurality of near-end participants and a far-end participant by coupling the first audio signal to a network that transmits the first audio signal to the far-end participant.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants during a telephone call with a far-end participant. The method includes receiving at the telephony gateway audio signals from the plurality of WCDs. The method includes generating in response to the audio signals a first audio signal. The generating comprises integrating the audio signals from the plurality of WCDs. The method includes coupling the first audio signal to a network for transmission to the far-end participant. The method includes receiving at the telephony gateway a second audio signal from the far-end participant; and outputting the second audio signal at a speaker coupled to the telephony gateway.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants during a telephone call with a far-end participant; receiving at the telephony gateway audio signals from the plurality of WCDs; generating in response to the audio signals a first audio signal, the generating comprising integrating the audio signals from the plurality of WCDs; coupling the first audio signal to a network for transmission to the far-end participant; receiving at the telephony gateway a second audio signal from the far-end participant; and outputting the second audio signal at a speaker coupled to the telephony gateway.

The establishing of the electronic pairing of an embodiment comprises establishing an electronic pairing between at least one wireless radio of the telephony gateway and a corresponding WCD of the plurality of WCDs, wherein the electronic pairing provides a dedicated channel between the telephony gateway and the corresponding WCD.

The integrating of the audio signals of an embodiment comprises calculating a dynamic gain for each dedicated channel corresponding to each WCD.

The calculating of the dynamic gain of an embodiment comprises calculating a root-mean-square when the near-end participant is speaking.

The method of an embodiment comprises electronically labeling each signal from each WCD.

Each WCD of an embodiment comprises at least one microphone.

The at least one microphone of an embodiment comprises an omnidirectional microphone.

The at least one microphone of an embodiment comprises a directional microphone.

The at least one microphone of an embodiment comprises two microphones.

The method of an embodiment comprises demultiplexing signals received at each WCD.

The method of an embodiment comprises performing echo cancellation on signals received at each WCD.

The method of an embodiment comprises performing noise suppression on signals received at each WCD.

The method of an embodiment comprises performing voice activity detection on signals received at each WCD.

The method of an embodiment comprises locating the speaker in each WCD. The method of an embodiment comprises transmitting the second audio signal to each WCD and outputting the second audio signal via the speaker.

The method of an embodiment comprises locating the speaker in the telephony gateway.

The method of an embodiment comprises outputting the first audio signal via the speaker.

The method of an embodiment comprises outputting the second audio signal via the speaker.

The method of an embodiment comprises hard-coding each WCD to the telephony gateway.

The method of an embodiment comprises electronically detecting at a WCD at least one other WCD within a pre-specified range of the WCD.

The method of an embodiment comprises controlling parameters of the telephone call using a telephone interface of the telephone gateway.

The wireless radio of an embodiment comprises a Bluetooth radio.

The method of an embodiment comprises recharging each WCD at the telephony gateway using a charger of the WCD.

The method of an embodiment comprises each WCD searching for at least one other WCD with which to electronically pair.

The method of an embodiment comprises each WCD searching for the telephony gateway with which to establish the electronic pairing.

The method of an embodiment comprises the telephony gateway searching for a WCD with which to establish the electronic pairing.

The method of an embodiment comprises classifying the electronic pairing between at least one WCD and the telephony gateway as transient. The method of an embodiment comprises erasing information of the electronic pairing subsequent to completion of the telephone call.

The method of an embodiment comprises demultiplexing at the telephony gateway each incoming signal from each WCD.

The method of an embodiment comprises performing at the telephony gateway echo cancellation on each incoming signal from each WCD.

The method of an embodiment comprises performing at the telephony gateway noise suppression on each incoming signal from each WCD.

The method of an embodiment comprises performing at the telephony gateway voice activity detection on each incoming signal from each WCD.

The method of an embodiment comprises performing at the telephony gateway spatialization on each incoming signal from each WCD.

The method of an embodiment comprises performing at the telephony gateway equalization on each incoming signal from each WCD.

The method of an embodiment comprises managing and controlling at the telephony gateway the audio channel with the WCD.

Embodiments of the wireless conference call telephone system can be a component of a single system, multiple systems, and/or geographically separate systems. The wireless conference call telephone system can also be a subcomponent or subsystem of a single system, multiple systems, and/or geographically separate systems. The wireless conference call telephone system can be coupled to one or more other components (not shown) of a host system or a system coupled to the host system.

One or more components of the wireless conference call telephone system and/or a corresponding system or application to which the wireless conference call telephone system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the wireless conference call telephone system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the wireless conference call telephone system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the wireless conference call telephone system and corresponding systems and methods include: microcontrollers with memory (such as electronically erasable programmable read only memory (EEPROM)), embedded microprocessors, firmware, software, etc. Furthermore, aspects of the wireless conference call telephone system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the wireless conference call telephone system and corresponding systems and methods is not intended to be exhaustive or to limit the systems and methods to the precise forms disclosed. While specific embodiments of, and examples for, the wireless conference call telephone system and corresponding systems and methods are described herein for illustrative purposes, various equivalent modifications are possible within the scope of the systems and methods, as those skilled in the relevant art will recognize. The teachings of the wireless conference call telephone system and corresponding systems and methods provided herein can be applied to other systems and methods, not only for the systems and methods described above.

The elements and acts of the various embodiments described above can be combined to provide further embodiments. These and other changes can be made to the wireless conference call telephone system and corresponding systems and methods in light of the above detailed description.

What is claimed is:

1. A system comprising:
at least one wireless communication device (WCD) worn by at least one near-end participant during a telephone call with a far-end participant, each WCD comprises a body-worn pendant having a pendant body,
the pendant body including first and second connecting structures coupled with the pendant body and operative to mount the body-worn pendant like a necklace when the first and second connecting structures are connected to each other, a radio, a battery, a digital signal processor (DSP), a microphone array coupled with the DSP, a multi-use button, and a plurality of vents; and
a telephony gateway remote to the at least one WCD and including an audio processor coupled to at least one wireless radio that forms at least one audio channel with the at least one WCD,
wherein the audio processor generates an integrated audio signal from signals received from the at least one WCD,
wherein the telephony gateway comprises a connection component coupled to the audio processor and to a network carrying the telephone call,
wherein the connection component couples the integrated audio signal to the network for transmission to the far-end participant,
wherein the telephony gateway including a processor that is separate and distinct from the audio processor, and the processor electronically labels each incoming signal from the at least one WCD.

2. A system comprising:
a plurality of wireless communication devices (WCDs) worn by a plurality of near-end participants during a telephone call with a far-end participant, each WCD comprises a body-worn pendant having a pendant body,
the pendant body including first and second connecting structures coupled with the pendant body and operative to mount the body-worn pendant like a necklace when the first and second connecting structures are connected to each other, a radio, a battery, a digital signal processor (DSP), a microphone array coupled with the DSP, a multi-use button, and a plurality of vents; and a telephony gateway remote to the plurality of WCDs and including an audio processor coupled to at least one wireless radio that forms a dedicated audio channel with each WCD of the plurality of WCDs, wherein the audio processor generates an integrated audio signal from the plurality of signals received from the plurality of WCDs, wherein the telephony gateway comprises a connection component coupled to the audio processor and to a network carrying the telephone call, wherein the connection component couples the integrated audio signal to the network for transmission to the far-end participant, wherein the telephony gateway including a processor that is separate and distinct from the audio processor, and the processor electronically labels each incoming signal from each WCD.

3. A system comprising:

a plurality of wireless communication devices (WCDs), wherein each WCD is worn by a near-end participant during a telephone call with a far-end participant, each WCD comprises a body-worn pendant having a pendant body, the pendant body including first and second connecting structures coupled with the pendant body and operative to mount the body-worn pendant like a necklace when the first and second connecting structures are connected to each other, a radio, a battery, a digital signal processor (DSP), a microphone array coupled with the DSP, a multi-use button, and a plurality of vents; and a telephony gateway including,
  a plurality of radios, wherein each radio is electronically paired with a corresponding WCD of the plurality of WCDs and provides a dedicated channel with the corresponding WCD;
  an audio processor coupled to the plurality of radios, wherein the audio processor integrates signals received from the plurality of WCDs into a first audio signal;
  a telephony component coupled to the audio processor and to a network carrying the telephone call, wherein the telephony component couples the first audio signal to the network for transmission to the far-end participant, wherein the telephony component receives a second audio signal from the far-end participant;
  a telephone interface coupled to the telephony component, wherein the telephone interface is used to control parameters of the telephone call,
  wherein the telephony gateway including a processor that is separate and distinct from the audio processor, and the processor electronically labels each incoming signal from each WCD.

4. The system of claim 3, wherein the microphone array includes at least one microphone.

5. The system of claim 4, wherein the at least one microphone comprises an omnidirectional microphone.

6. The system of claim 3, wherein each WCD includes a detector, wherein the detector of a WCD electronically detects at least one WCD within a pre-specified range of the WCD.

7. The system of claim 3, wherein the audio processor integrates signals received from the plurality of WCDs by calculating a dynamic gain for each dedicated channel corresponding to each WCD.

8. The system of claim 3, wherein the plurality of radios comprise a plurality of Bluetooth radios.

9. The system of claim 3, wherein at least one WCD includes a pairing mode, wherein in the pairing mode the at least one WCD searches for at least one of the telephony gateway and at least one other WCD with which to electronically pair.

10. The system of claim 3, wherein the telephony gateway includes a pairing mode, wherein in the pairing mode the telephony gateway searches for at least one WCD with which to electronically pair.

11. The system of claim 3, wherein the electronic pairing between a WCD of the plurality of WCDs and the telephony gateway is classified as transient, wherein the pairing classified as transient is subsequently erased by the telephony gateway.

12. The system of claim 3, wherein the audio processor comprises an audio processing subsystem.

13. The system of claim 12, wherein the audio processing subsystem performs demultiplexing on each incoming signal from each WCD.

14. The system of claim 12, wherein the audio processing subsystem performs echo cancellation on each incoming signal from each WCD.

15. The system of claim 12, wherein the audio processing subsystem performs noise suppression on each incoming signal from each WCD.

16. The system of claim 12, wherein the audio processing subsystem performs voice activity detection on each incoming signal from each WCD.

17. The system of claim 12, wherein the audio processing subsystem performs spatialization on each incoming signal from each WCD.

18. The system of claim 12, wherein the audio processing subsystem performs equalization on each incoming signal from each WCD.

19. The system of claim 3, wherein the audio processor comprises a connection management subsystem that manages the dedicated channels with the plurality of WCDs.

* * * * *